United States Patent
Hui-Chen

(10) Patent No.: US 6,241,291 B1
(45) Date of Patent: Jun. 5, 2001

(54) PIPE CONNECTOR

(76) Inventor: Chao Hui-Chen, 75, Liau Tsuo Hsiang, Liau Tsuo Li, Lu Kang Chen, Chan Hua Hsien (TW)

( * ) Notice: Subject to any disclaimer, the term of this patent is extended or adjusted under 35 U.S.C. 154(b) by 0 days.

(21) Appl. No.: 09/591,049

(22) Filed: Jun. 9, 2000

(51) Int. Cl.⁷ .............................. F16L 33/22; F16L 19/00
(52) U.S. Cl. ........................ 285/249; 285/322; 285/323
(58) Field of Search .................................. 285/248, 249, 285/322, 243, 323

(56) References Cited

U.S. PATENT DOCUMENTS 4,192,532 * 3/1980 Pacella .................................. 285/248

FOREIGN PATENT DOCUMENTS

| 280598 | * | 9/1965 | (AU) | 285/248 |
| 1093151 | * | 11/1960 | (DE) | 285/249 |
| 1095068 | * | 12/1960 | (DE) | 285/249 |
| 503737 | * | 9/1992 | (EP) | 285/249 |
| 1496737 | * | 10/1967 | (FR) | 285/249 |
| 956500 | * | 4/1964 | (GB) | 285/249 |
| 62497 | * | 3/1990 | (JP) | 285/248 |

* cited by examiner

Primary Examiner—Eric K Nicholson
(74) Attorney, Agent, or Firm—Harrison & Egbert

(57) ABSTRACT

A pipe connector is formed of a threaded tube, two inner tubes, and two fitting tubes. The threaded tube is provided at two longitudinal ends with an outer threaded portion. The inner tubes are fitted at one end thereof into the two longitudinal ends of the threaded tube. The inner tubes are provided at an opposite end with a plurality of elastic pieces. The fitting tubes are fastened to the two longitudinal ends of the threaded tube such that the inner threaded portion of the fitting tubes is engaged with the outer threaded portion of the threaded tube. The fitting tubes are provided in the outer surface thereof with a gripping portion for locating an annular ring which is fitted thereover.

1 Claim, 6 Drawing Sheets

PIPE CONNECTOR

BACKGROUND OF THE INVENTION

Field of the Invention

The present invention relates to a pipe connector.

BACKGROUND OF THE INVENTION

As illustrated in FIG. 1, a prior art pipe connector is very primitive at best. There are currently a variety of modern pipe connectors, which are rather complicated in construction and are therefore inefficient. In addition, the conventional pipe connectors are not provided with an effective means to prevent a leak.

BRIEF SUMMARY OF THE INVENTION

The primary objective of the present invention is to provide a quick pipe connector which is simple in construction and is leakproof.

The pipe connector of the present invention comprises a threaded tube, two inner tubes, and two fitting tubes. The two inner tubes are held by two ends of the threaded tube. The two fitting tubes are engaged with the two ends of the threaded tube such that the inner tubes are fitted into the fitting tubes in conjunction with an elastic piece.

The foregoing objective, features, and advantages of the present invention will be more readily understood upon a thoughtful deliberation of the following detailed description of a preferred embodiment of the present invention with reference to the accompanying drawings.

BRIEF DESCRIPTION OF THE SEVERAL VIEWS OF THE DRAWINGS

FIG. 4 shows a sectional view of the preferred embodiment of the present in.

DETAILED DESCRIPTION OF THE INVENTION

Figure 1:
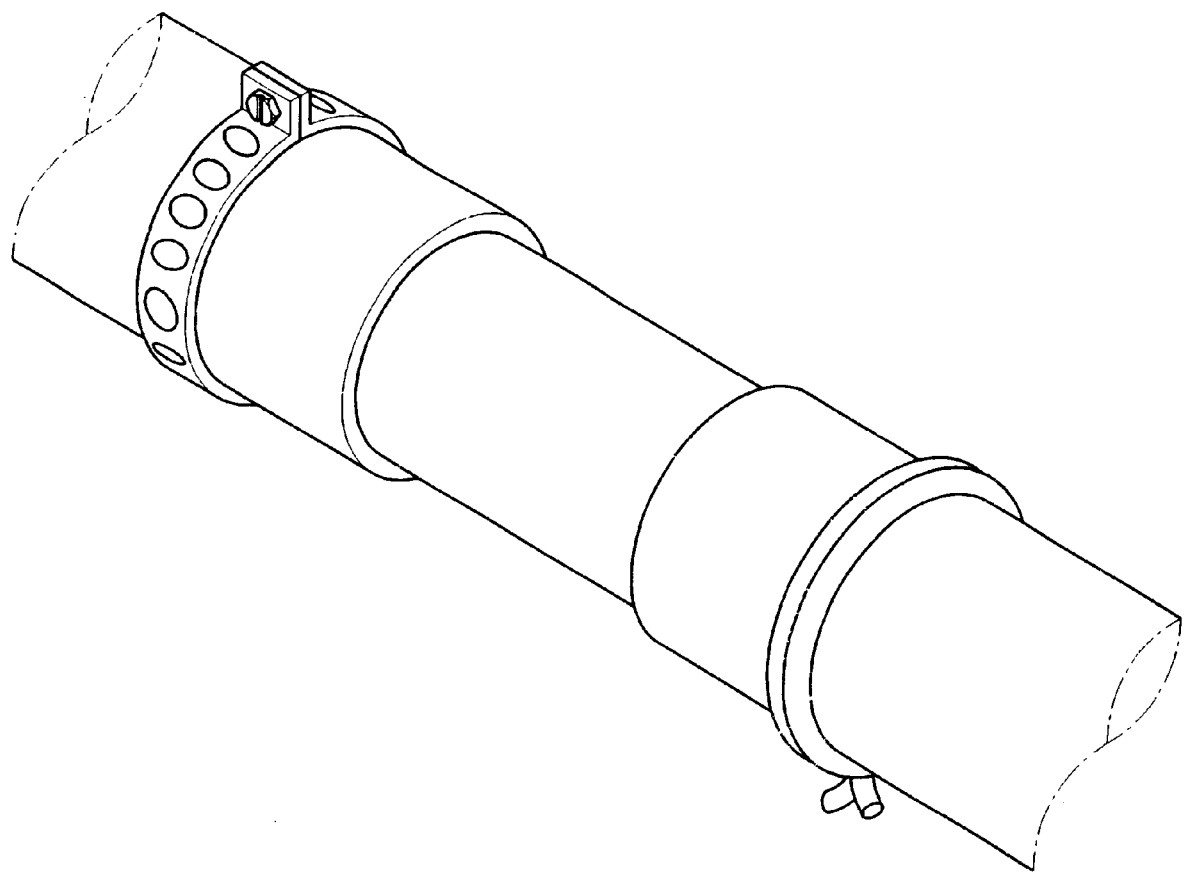
FIG. 1 shows a schematic view of a pipe connector of the prior art at work.
Figure 2:
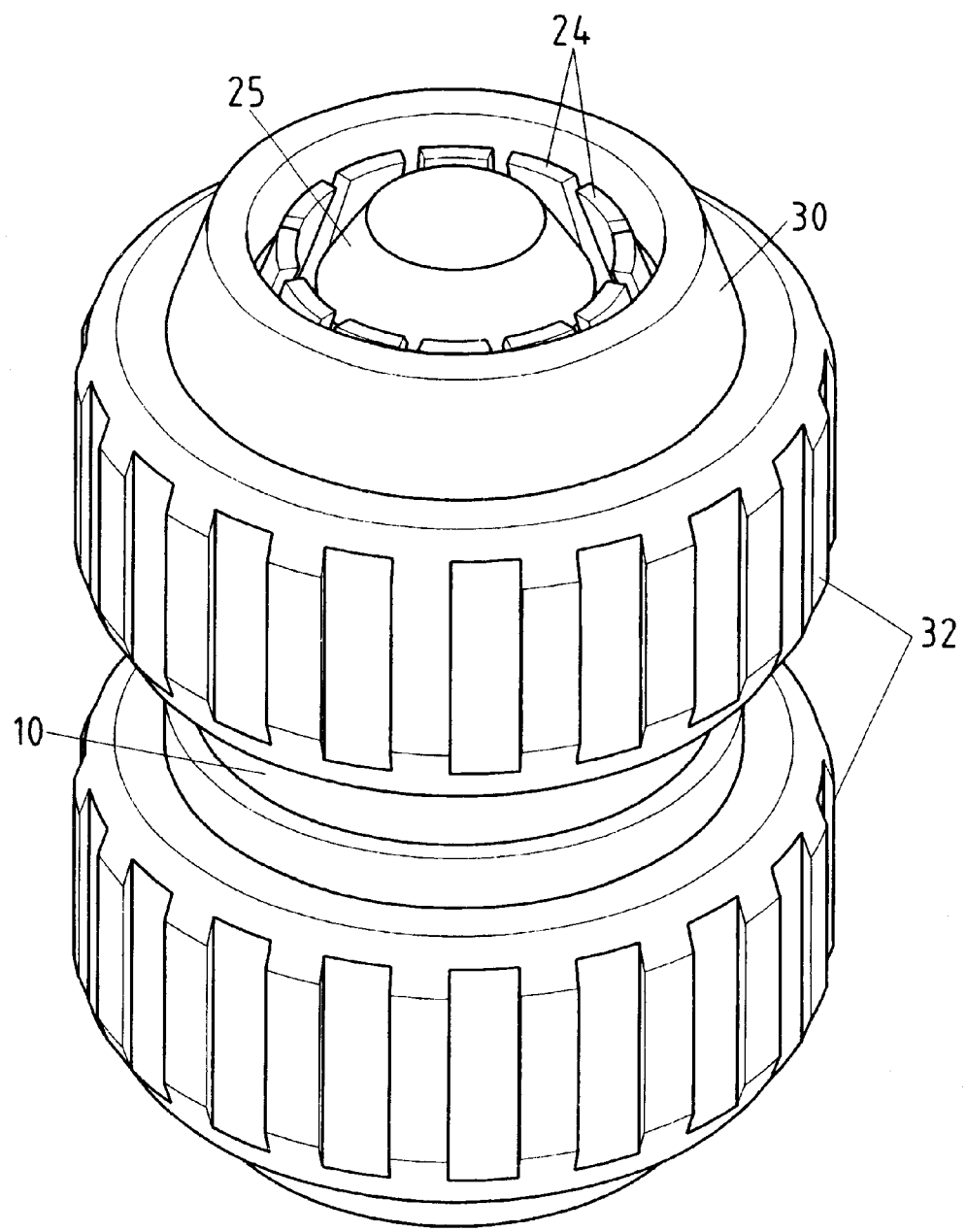
FIG. 2 shows a perspective view of the preferred embodiment of the present invention.
Figure 3:
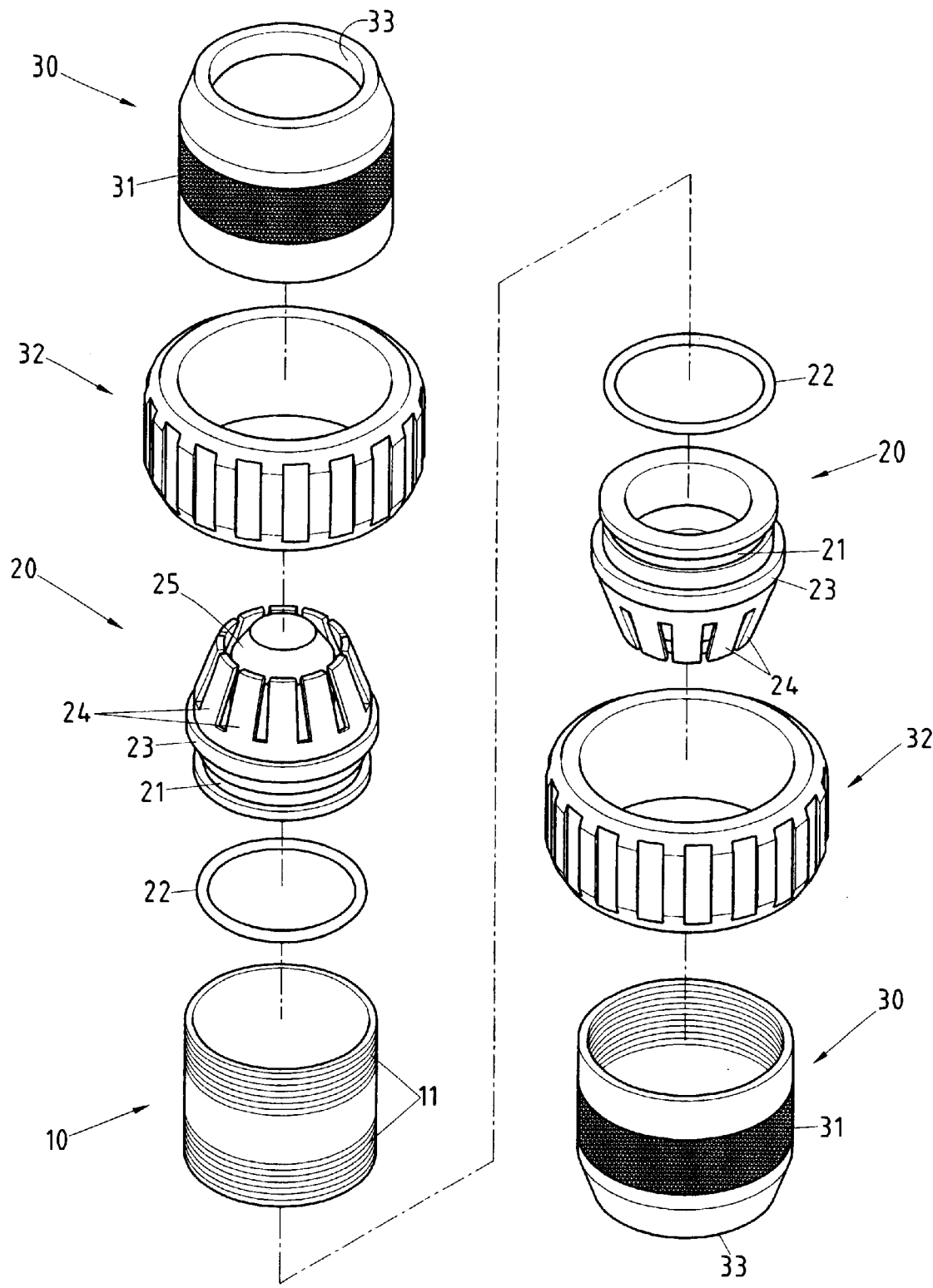
FIG. 3 shows an exploded view of the preferred embodiment of the present invention.
Figure 4:
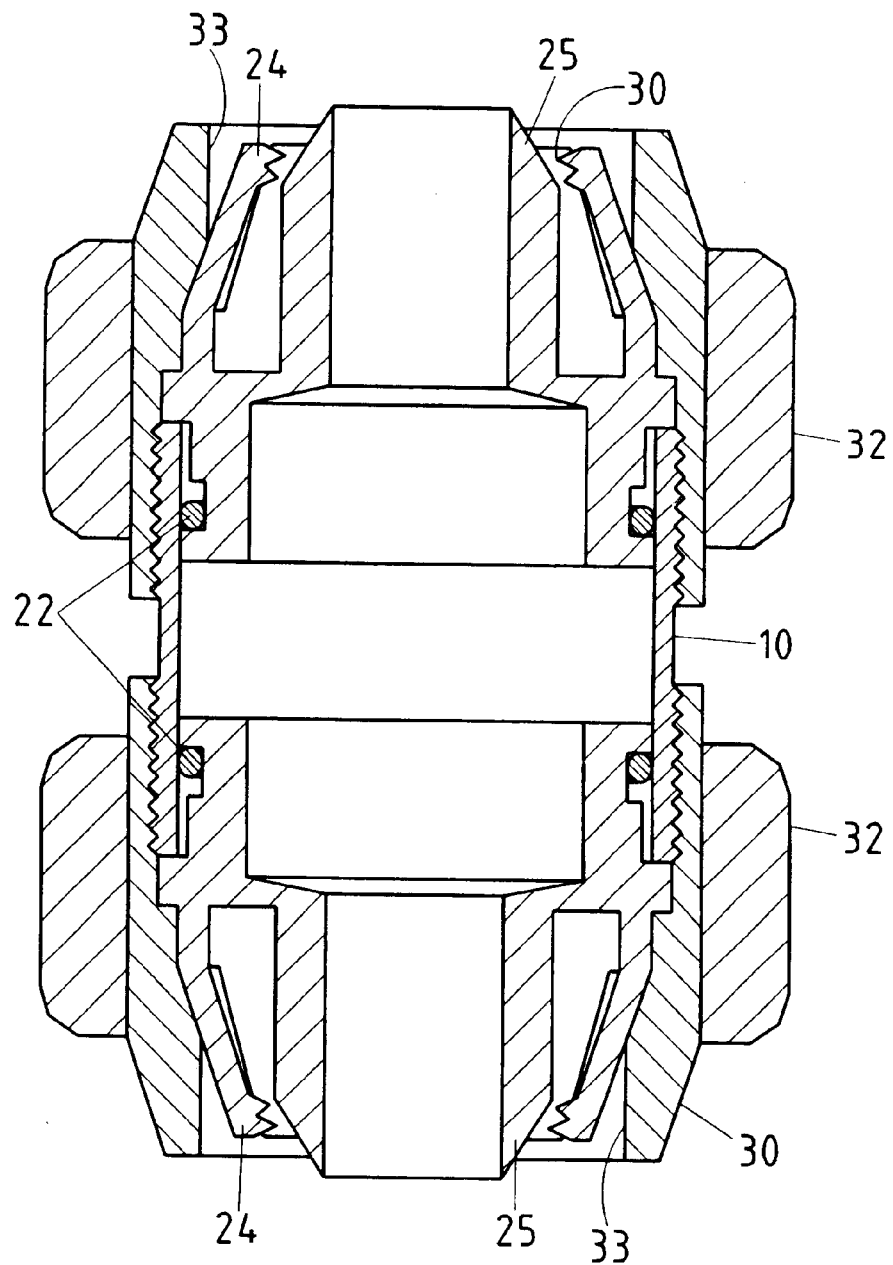

As shown in FIGS. 2–6, a pipe connector of the preferred embodiment of the present invention comprises a threaded tube 10, two inner tubes 20, and two fitting tubes 30.

The threaded tube 10 is provided in two longitudinal ends thereof with an outer threaded portion 11.

The two inner tubes 20 are provided at one end with an annular groove 21 and a washer 22 which is disposed in the annular groove 21. The two inner tubes 20 are further provided at the other end with a plurality of elastic pieces 24 and a tubular body 25. The two inner tubes 20 are further provided in the midsegment with an annular projection 23. The two inner tubes 20 are respectively fitted into the longitudinal ends of the threaded tube 10 such that the washer 22 is in intimate contact with the inner wall of the longitudinal ends of the threaded tube 10, and that the annular projection 23 presses against the edge of the longitudinal end of the threaded tube 10.

The two fitting tubes 30 are provided in one longitudinal end with an inner threaded portion, and in the other longitudinal end with an opening 33. The two fitting tubes 30 are provided in the midsegment with a gripping portion 31 located in the outer surface thereof for locating a fitting ring 32. The two fitting tubes 30 are fastened to the two longitudinal ends of the threaded tube 10 such that the inner threaded portions of fitting tubes 30 are engaged with the outer threaded portions 11 of the threaded tube 10.

Figure 5:
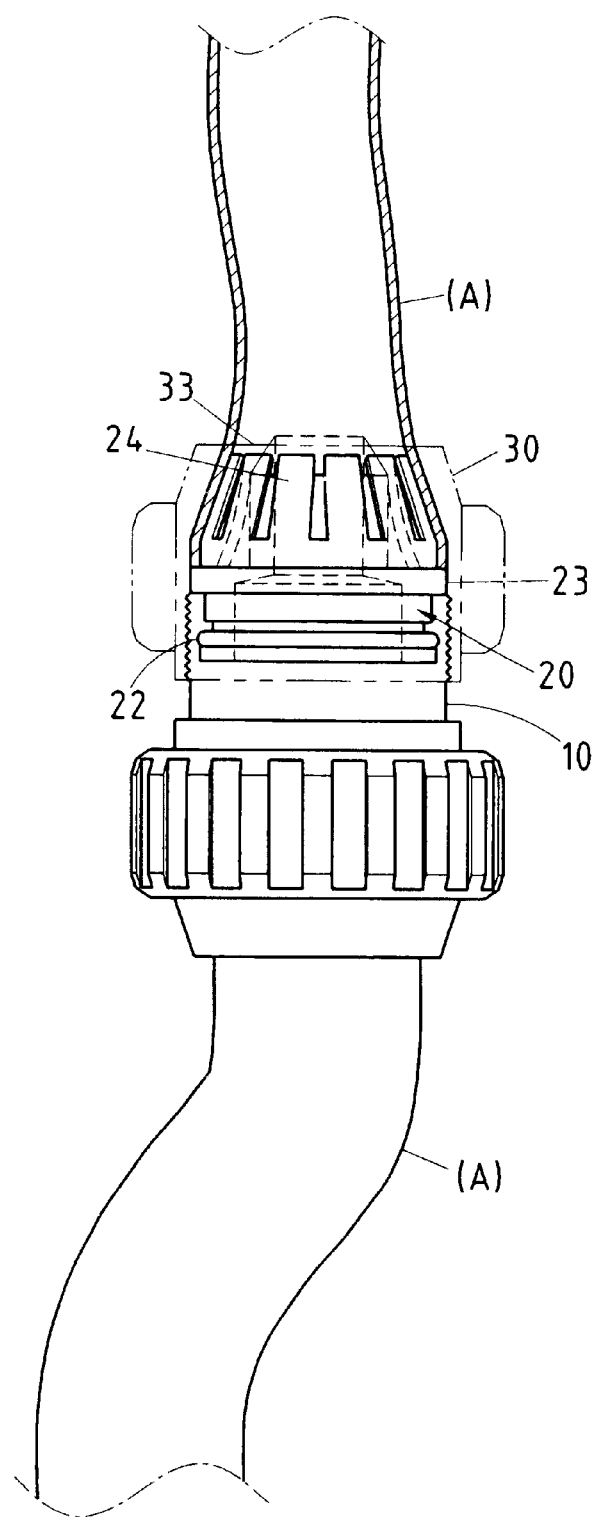
FIG. 5 shows a schematic view of the preferred embodiment of the present invention at work.
Figure 6:
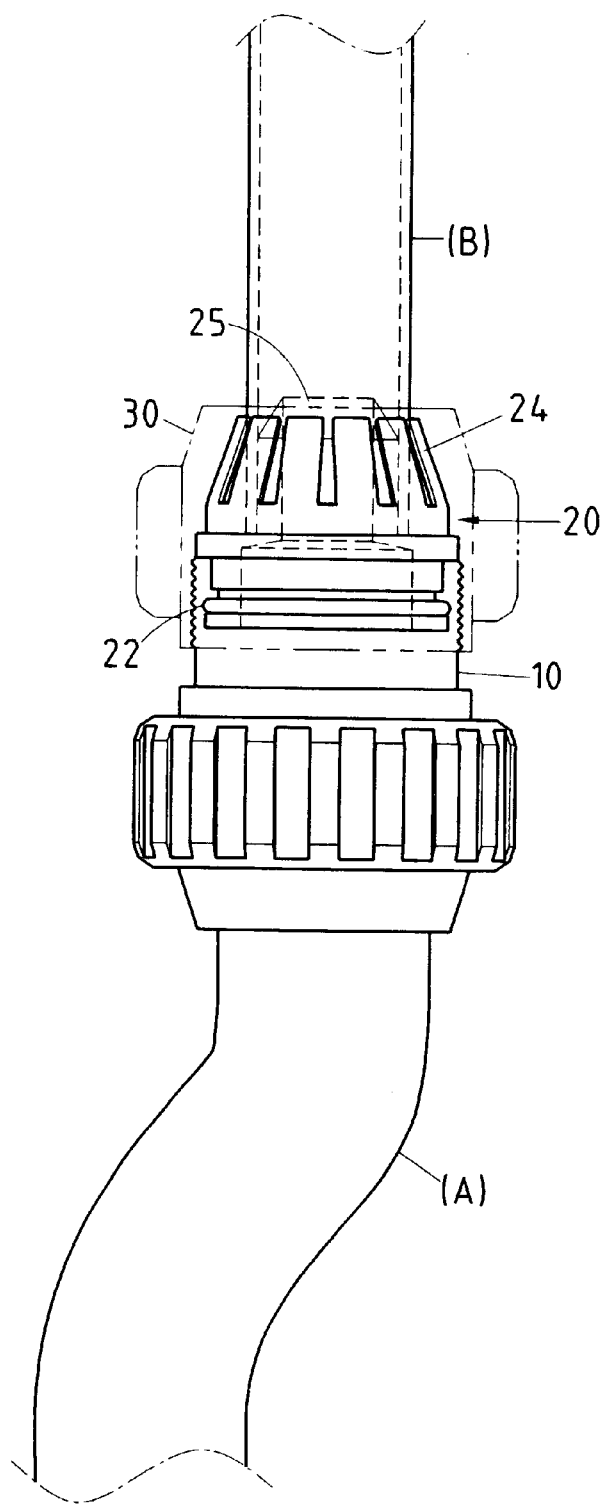
FIG. 6 shows another schematic view of the preferred embodiment of the present invention at work.

As shown in FIGS. 5 and 6, two pipes "A" are connected by the pipe connector of the present invention in such a manner that one pipe is fitted over the elastic pieces 24 of the inner tube 20, and that the edge of the one pipe is stopped by the annular projection 23. As the fitting ring 32 is turned, the fitting tube 30 is further engaged with the threaded tube 10, the end edge of the pipe "A" is secured in place between the opening 33 of the fitting tube 30 and the elastic pieces 24 of the inner tube 20. The tubular body 25 of the inner tubes 20 is intended to accommodate a rigid pipe "B", as shown in FIG. 6.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A pipe connector comprising:

a threaded tube having an outer threaded portion at opposite ends therof, said threaded tube having a longitudinal axis, said threaded tube having a flat surface extending transverse to said longitudinal axis at each of said opposite ends;

a first inner tube having an annular groove formed adjacent one end thereof, said first inner tube having a washer disposed in said annular groove, said first inner tube having a plurality of elastic pieces formed at an opposite end thereof, said first inner tube having a tubular body formed interior of said plurality of elastic pieces and extending outwardly therefrom at said opposite end, said first inner tube having an annular projection extending radially outwardly therefrom, said annular projection having a flat surface in abutment with said flat surface at one end of said threaded tube, said washer being in compressive contact with an interior surface of said threaded tube;

a second inner tube having an annular groove formed adjacent one end thereof, said second inner tube having a washer disposed in said annular groove, said second inner tube having a plurality of elastic pieces formed at an opposite end thereof, said second inner tube having a tubular body formed interior of said plurality of elastic pieces and extending outwardly therefrom at said opposite end, said second inner tube having an annular projection extending radially outwardly therefrom, said annular projection of said second inner tube having a flat surface in abutment with said flat surface at another end of said threaded tube opposite said first inner tube, said washer of said second inner tube being in compressive contact with an interior surface of said threaded tube;

a first fitting tube having an inner threaded portion formed adjacent one end thereof, said first fitting tube having an opening at an opposite end thereof, said first fitting tube having a knurled portion formed on an exterior surface thereof between said ends of said first fitting tube, said first fitting having said inner threaded portion fastened to said outer threaded portion at one end of said threaded tube, said first fitting tube having an interior tapered surface positioned adjacent said opening;

a first fitting ring affixed over said knurled portion of said first fitting tube;

a second fitting tube having an inner threaded portion formed adjacent one end thereof, said second fitting tube having an opening at an opposite end thereof, said second fitting tube having a knurled portion formed on an exterior surface thereof between said ends of said second fitting tube, said second fitting tube having said inner threaded portion fastened to said outer threaded portion at another end of said threaded tube opposite said first fitting tube, said second fitting tube having an interior tapered surface positioned adjacent said opening of said second fitting tube; and a second fitting ring affixed over said knurled portion of said second fitting tube.

* * * * *